United States Patent [19]

Endo et al.

[11] Patent Number: 4,994,535
[45] Date of Patent: Feb. 19, 1991

[54] METATHESIS POLYMERIZATION CROSS-LINKED HALOGEN-CONTAINING COPOLYMER

[75] Inventors: Zen-ichiro Endo; Shigeyoshi Hara; Hiroshi Mera, all of Iwakuni, Japan

[73] Assignee: Hercules Incorporated, Wilmington, Del.

[21] Appl. No.: 462,920

[22] Filed: Jan. 10, 1990

Related U.S. Application Data

[63] Continuation of Ser. No. 159,091, Feb. 23, 1988, abandoned.

[30] Foreign Application Priority Data

Feb. 23, 1987 [JP] Japan .................................. 62-37824
Jul. 1, 1987 [JP] Japan .................................. 62-162235

[51] Int. Cl.$^5$ ............................................. C08F 26/06
[52] U.S. Cl. .................................... 526/259; 526/281; 526/280; 526/283
[58] Field of Search ................. 526/259, 281, 280, 283

[56] References Cited

U.S. PATENT DOCUMENTS

| | | | |
|---|---|---|---|
| 3,945,986 | 3/1976 | Ofstead | 526/280 |
| 3,959,234 | 5/1976 | Kurosawa | 526/280 |
| 4,250,063 | 2/1981 | Kotani | 526/280 |
| 4,708,969 | 11/1987 | Leach | 521/82 |

*Primary Examiner*—Christopher Henderson
*Attorney, Agent, or Firm*—William S. Alexander

[57] ABSTRACT

A cross-linked copolymer containing repeating units derived from dicyclopentadiene and metathesis polymerizable halogen-containing cycloalkenes, a process for producing the copolymer, a process for producing a molded article from the copolymer and a polymerizable composition therefor.

4 Claims, No Drawings

METATHESIS POLYMERIZATION CROSS-LINKED HALOGEN-CONTAINING COPOLYMER

This application is a continuation of application Ser. No. 07/159,091, filed Feb. 23, 1988 now abandoned.

FIELD OF THE INVENTION

This invention relates to a metathesis polymerized cross-linked halogen-containing copolymer, a process for producing the copolymer, a process for producing a molded article from the copolymer, a polymerizable composition used for producing the copolymer and the molded article and a molded article produced from the copolymer.

BACKGROUND OF THE INVENTION

It is disclosed in U.S. Pat. No. 4,400,340 and U.S. Pat. No. 4,426,502 that ring-opening polymerization of a cycloolefin containing norbornene moiety, e.g. dicyclopentadiene (called "DCP" hereinafter), in the presence of a metathesis polymerization catalyst system produces a crosslinked polymer containing olefinic groups in the main chain Said U.S. Pat. No. 4,400,340 and U.S. Pat. No. 4,426,502 disclose the production of a molded article by injecting a reactive liquid mixture comprising norbornene-type monomer such as DCP and a metathesis polymerization catalyst system into a mold in which said liquid mixture is metathesis polymerized in bulk (called "RIM process" hereinafter). RIM process is a low pressure one-step or one-shot injection of a liquid mixture into a closed mold where rapid polymerization occurs resulting in a molded article. Thus, there are easily produced large-sized molded articles from DCP and the like by RIM process. The molded articles have been taken notice from the industrial point of view since they have attractive physical properties as balanced in stiffness and impact resistance.

The cross-linked DCP polymer and molded articles, however, are composed of hydrocarbon polymer. Thus, they are flammable and will burn continuously when ignited. Further, the polymer and molded articles produced from DCP have low softening points generally below 100° C. Those undesirable characteristics of the DCP polymer and molded articles often limit the use of them.

On the other hand, there has been proposed the addition of flame retardants, such as decabromodiphenylether and the like, to the polymerizable DCP mixture. However, the addition of such flame retardants often produces troubles in the metathesis polymerization of DCP. That is, the metathesis polymerization catalyst system is generally highly reactive and often reacts with the flame retardants to reduce its catalytic activity. Furthermore, even if such flame retardants do not reduce the activity of the metathesis catalyst system, such flame retardants have high density and are generally insoluble and less dispersible in monomer solutions. The insolubility and less-dispersibility often cause less-workability in the molding process. Further, the addition of flame retardants often impairs the mechanical properties of the polymer and molded article.

In addition, there are some proposals to raise the softening point of DCP polymer. Among of them is included the copolymerization of DCP with other metathesis polymerizable monomers having bulky cyclic structure, such as dimethanooctahydronaphthalene, dimethanohexahydronaphthalene and the like. Such comonomers, however, do not provide the polymer with flame retardancy and improved solvent resistance.

Other methods to raise the softening point are the introduction of polar groups such as amido-, nitrile- and imido-groups into DCP polymer. However, amide groups often inhibit the metathesis polymerization reaction, and nitrile- and imido-groups tend to retard the polymerization reaction.

Now, we have found that metathesis polymerizable halogen-containing cycloalkenes can be readily copolymerized with DCP without inhibiting the metathesis polymerization reaction and can provide DCP-polymer with flame retardancy as well as raised softening point.

Therefore, it is an object of the present invention to provide a metathesis polymerized cross-linked halogen-containing copolymer having flame retardancy and raised softening point.

A further object is to provide a process for producing said copolymer. Another object is to provide a process for producing a molded article comprising the copolymer. A further object is to provide a polymerizable composition used for producing copolymer and the molded article. Another object is to provide a molded article.

SUMMARY OF THE INVENTION

The present invention relates to a metathesis polymerized cross-linked copolymer comprising:

(a) 60–1 mole % of repeating units derived from at least one metathesis polymerizable halogen-containing cycloalkenes, and (b) 40–99 mole % of repeating units derived from at least one metathesis polymerizable cyclic compounds which include at least 30 mole %, based on total moles of the cyclic compounds, of dicyclopentadiene but do not contain any halogen atom in its structure.

Further, the present invention relates to a process of producing a cross-linked halogen-containing copolymer, which comprises metathesis polymerizing in the presence of a metathesis polymerization catalyst system a monomer mixture comprising:

(a) 60–1 mole % of at least one of metathesis polymerizable halogen-containing cycloalkenes, and (b) 40–99 mole % of at least one of metathesis polymerizable cyclic compounds which include at least 30 mole %, based on total moles of the cyclic compounds, of dicyclopentadiene do not contain any halogen atom in the structure.

In addition, the present invention relates to a process for producing a molded article by introducing a reactive liquid mixture which comprises said metathesis polymerizable cycloalkenes (a) and cyclic compounds (b) and a metathesis polymerization catalyst system into a mold in which said liquid mixture is metathesis polymerized in bulk to produce the molded article.

The present invention further relates to a multipart polymerizable composition, which comprises said metathesis polymerizable cycloalkenes (a) and cyclic compounds (b), and the metathesis polymerization catalyst system comprising a catalyst and an activator, said catalyst and activator being not present in the same part.

The present invention further provides a molded article produced from said copolymer.

DETAILED DESCRIPTION OF THE INVENTION

In the present invention, as said halogen-containing cycloalkenes (a), there can be used any of cycloalkenes having at least one metathesis polymerizable cycloalkene moiety and at least one halogen atom in the molecule.

As said cycloalkenes (a), there are preferably used those being compatible with said metathesis polymerizable cyclic compounds (b) including DCP.

As the metathesis polymerizable cycloalkene moieties of the cycloalkenes (a), there can be used any cycloalkene moieties which are metathesis polymerizable. Among of them, however, condensed poly-ring cycloalkene moieties having cyclopentene ring shown by structural formula

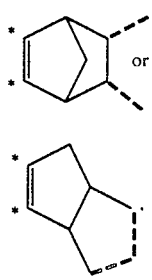

(1)

or (2)

especially the moieties shown by the former formula (1), are preferable.

Said cycloalkenes (a) have one or more, preferably two or more, halogen atoms in the molecule. Among halogen atoms, bromine and chlorine are preferable.

Halogen atoms may be bonded directly to any positions of the metathesis polymerizable cycloalkene moieties with the proviso that halogen atoms do not hinder the metathesis polymerization of the cycloalkenes.

For example, in the above structural formula (1) or (2), if halogen atoms are bonded to carbon atoms shown by star marks (*), the metathesis polymerization will be hindered.

On the other hand, as said cycloalkenes (a), there may be also used those in which at least one of halogenated substituent groups are bonded to the metathesis polymerizable cycloalkene moieties but halogen atoms are not bonded directly to the cycloalkene moieties. As the halogenated substituent groups, halogenated aromatic groups, especially halogenated phenyl groups; halogenated aliphatic groups, especially halogenated methyl groups; and halogenated alicyclic groups are preferable. Those substituent groups, preferably from one to three of the substituent groups, may be bonded to the metathesis polymerizable cycloalkene moieties directly or indirectly through bonding groups.

When the halogenated substituent groups are bonded to the metathesis polymerizable cycloalkene moiety indirectly through the bonding groups, the bonding groups may include hetero atoms such as oxygen, nitrogen, sulfur, silicon and the like in the form of ether, ester, imido, siloxane and the like. Further, the halogenated substituents groups may be those having other substituent such as lower alkyl group, esterified carboxylic group, etherified alkyl group, cyano group and the like.

Preferable examples of said halogen-containing cycloalkenes include the following groups (I)–(V).

(I) Cycloalkenes produced by reacting halogenated ethylene with a diene according to the following Diels-Alder addition reaction formula (I-i), (I-ii) or (I-iii).

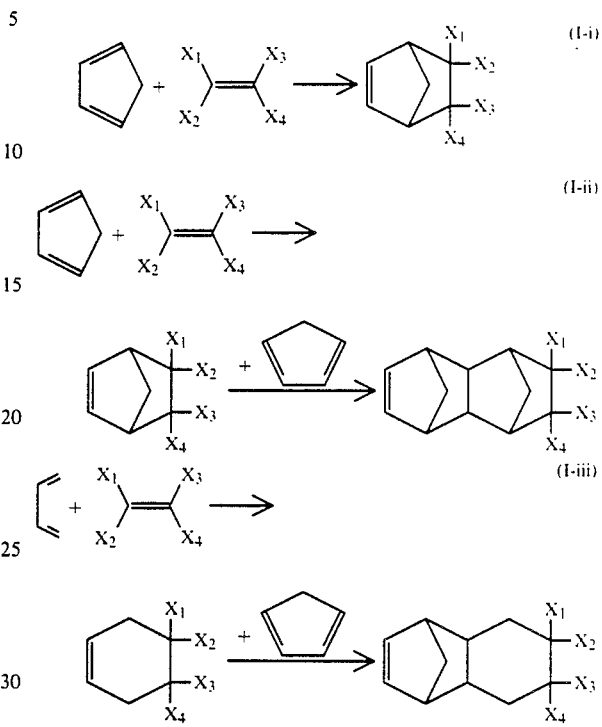

wherein at least one of $X_1$, $X_2$, $X_3$ and $X_4$ present halogen atoms and the remainder presents hydrogen atom.

Concrete examples are recited below.

| | |
|---|---|
| 5,5,6,6-tetrachloronorbornene | 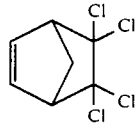 |
| 5,5,6-trichloronorbornene | 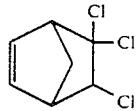 |
| 5,5-dichloronorbornene | 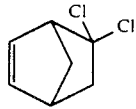 |
| 5,6-dichloronorbornene | 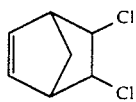 |
| 5-chloronorbornene | 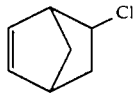 |
| 5,5,6-tribromonorbornene | 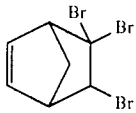 |

| | | | |
|---|---|---|---|
| 5,5-dibromonorbornene | 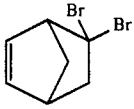 | 6-bromo-1,4:5,8-dimethano-1,4,4a-5,6,7,8,8a-octahydronaphthalene | 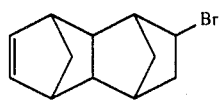 |
| 5,6-dibromonorbornene | 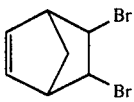 | 6,7-dibromo-1,4:5,8-dimethano-1,4,4a,5,6,7,8,8a-octahydronaphthalene | 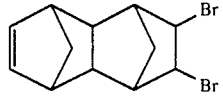 |
| 5-bromonorbornene | 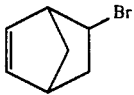 | 6,6,7-tribromo-1,4:5,8-dimethano-1,4,4a,5,6,7,8,8a-octahydronaphthalene | 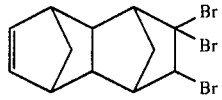 |
| 6-chloro-1,4:5,8-dimethano-1,4,4a,5,6,7,8,8a-octahydronaphthalene | 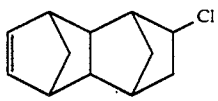 | 6-chloro-1,4-methano-1,4,4a,5,6,7,8,8a-octahydronaphthalene | 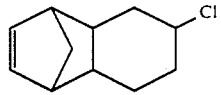 |
| 6,6-dichloro-1,4:5,8-dimethano-1,4,4a,5,6,7,8,8a-octahydronaphthalene |  | 6,7-dichloro-1,4-methano-1,4,4a,5,6,7,8,8a-octahydronaphthalene | 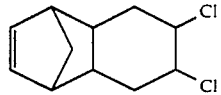 |
| 6,7-dichloro-1,4:5,8-dimethano-1,4,4a,5,6,7,8,8a-octahydronaphthalene |  | 6,6,7-trichloro-1,4-methano-1,4,4a,5,6,7,8,8a-octahydronaphthalene | 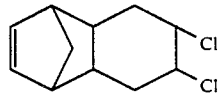 |
| 6,6,7-trichloro-1,4:5,8-dimethano-1,4,4a,5,6,7,8,8a-octahydronaphthalene |  | 6,6,7,7-tetrachloro-1,4-methano-1,4,4a,5,6,7,8,8a-octahydronaphthalene | 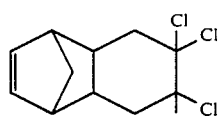 |
| 6,6,7,7,-tetrachloro-1,4,:5,8-dimethano-1,4,4a,5,6,7,8,8a-octahydronaphthalene |  | 6-bromo-1,4-methano-1,4,4a,5,6,7,8,8a-octahydronaphthalene | 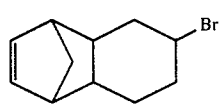 |

(II) Cycloalkenes produced by reacting hexachlorocyclopentadiene with another unsaturated compound under Diels-Alder addition reaciton.

Concrete examples are recited below.

1,4:5,8-dimethano-1,2,3,4,9,9-hexachloro-1,4,4a,5,8,8a-hexahydronaphthalene

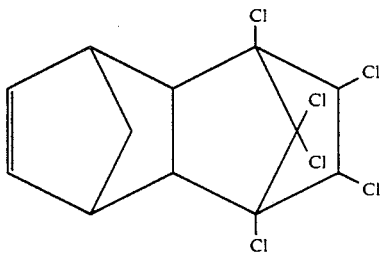

4,7-methano-1,1,2,3,3a,7a-hexachloro-3a,4,7,7a-tetrahydroindene (hexachlorodicyclopentadiene)

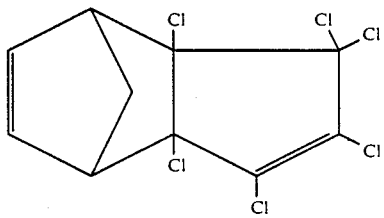

| | |
|---|---|
| 4,7-dichloromethano-4,5,6,7-tetrachloro-3a,4,7,7a-tetrahydroindene (hexachlorodicyclopentadiene) | 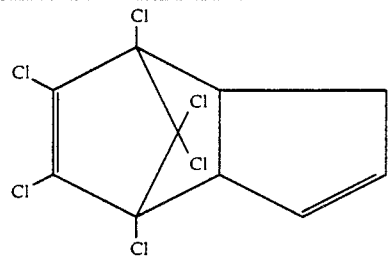 |
| 1,2,3,4,7,7,-hexachloro-5,5'-bisnorbornene | 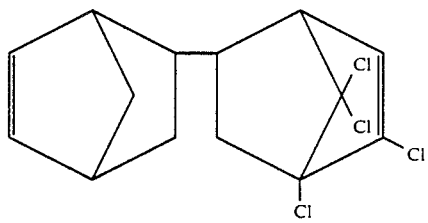 |
| 1,2,3,4,7,7-hexachloronorbornadiene | 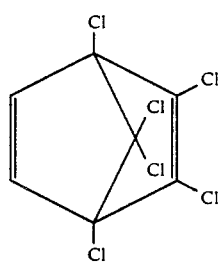 |
| 1,2,3,4,13,13-hexachloro-1,4,4a,5,6a,7,-10,10a,11,12,12a-dodecahydro-1,4:7,10-dimethano(a,e)cyclooctene | 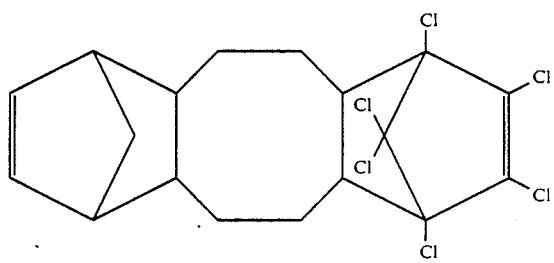 |

(III) Cycloalkenes having halogenated aliphatic or alicyclic substituent groups.

Concrete examples are recited below.

| | |
|---|---|
| 5-chloromethylnorbornene | 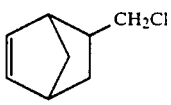 |
| 5-bromomethylnorbornene | 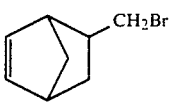 |
| 5,6-bis(chloromethyl)norbornene | 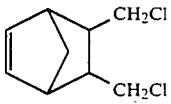 |
| 5,6-bis(bromomethyl)norbornene | 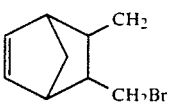 |

| | |
|---|---|
| 4,7-methano-1- or 2-chloro-2,3,3a,4,7,-7a-hezahydroindene | 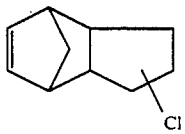 |
| 4,7-methano-1,2-dichloro-2,3,3a,4,7,7a-hexahydroindene | 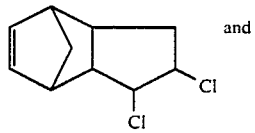 and |
| 5-(2,3,-dibromopropyloxycarbonyl)norbornene | 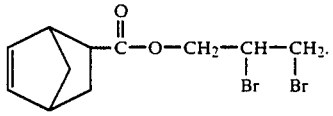 |

(IV) Cycloakenes having at least one halogenated aromatic substituent group bonded to cycloalkene moiety through a hydrocarbon bonding group, which include, for example, cycloalkenes shown by the following formulas,

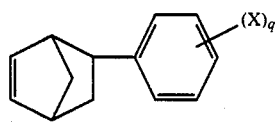

and

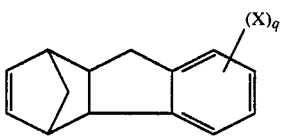

wherein X represents halogen atom, preferably Br or Cl, q represents and integer of 1-5, preferably 1-4.

(V) Cycloalkenes having at least one halogenated aromatic substituent group bonded to cycloalkene moiety through a hetero-atom containing group, which include, for example, cycloalkenes shown by the following formulas,

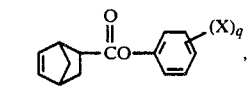

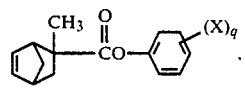

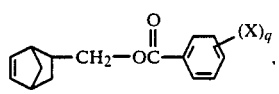

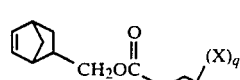

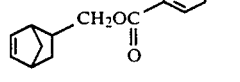

-continued

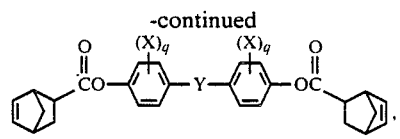

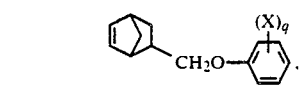

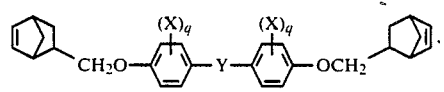

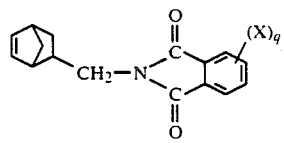

and

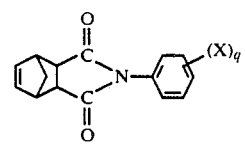

wherein X and q re as defined above, and Y represents $$-\underset{\underset{CH_3}{|}}{\overset{\overset{CH_3}{|}}{C}}-$$

or $-SO_2-$.

Cycloalkenes of group (V) can be produced by reacting a compound having a cycloalkene moiety with a compound having a halogenated aromatic group as shown, for example, by the following reaction formulas (V-i)-(V-iii).

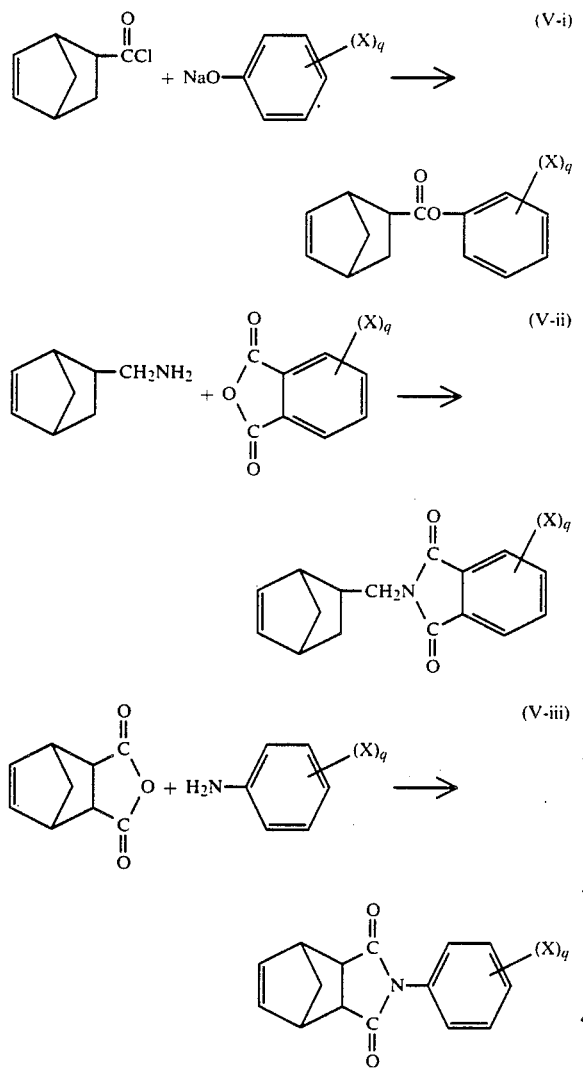

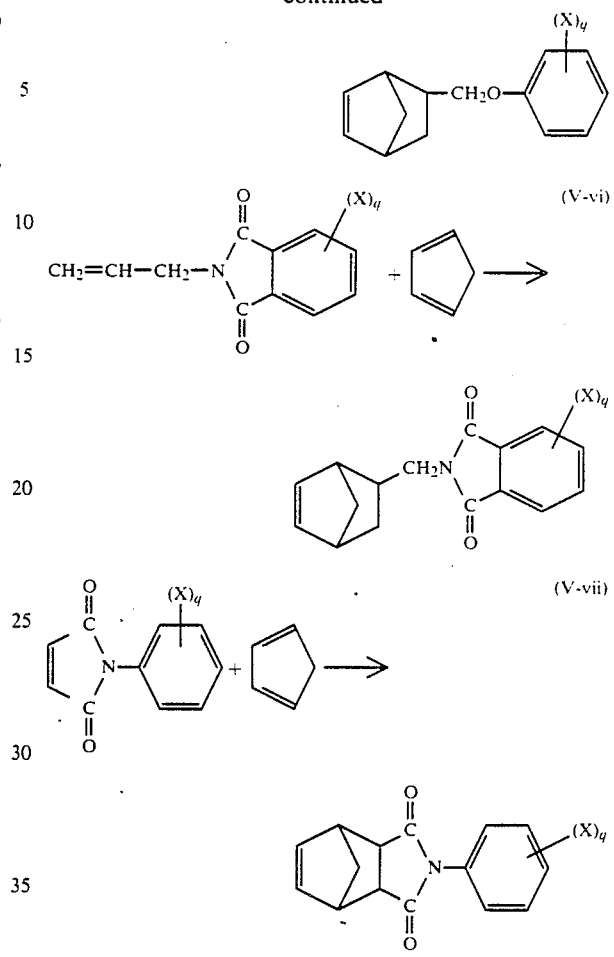

Cycloalkenes of group (V) can also be produced by Diels-Alder addition reaction of a cyclodiene, e.g. cyclopentadiene, with an unsaturated compound having a halogenated aromatic group as shown, for example, by the following reaction formulas (V-iv)–(V-vii).

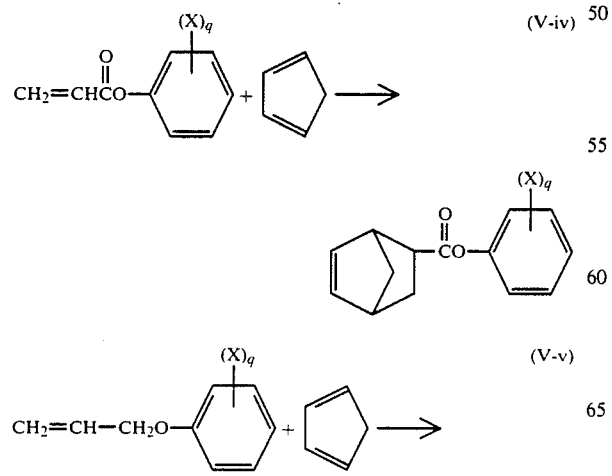

Among cycloalkenes of the above groups (I)–(V), cycloalkenes of groups (I)–(III) are generally liquid, and even when they are solid at room temperature, they are easily miscible with other metathesis cyclic compounds (b), such as DCP. On the other hand, cycloalkenes of groups (IV)–(V) are generally solid having rather high melting points. Therefore, it is most preferred that cycloalkenes of groups (IV)–(V) are soluble in the cyclic compounds (b) at room temperature.

Even if they are insoluble at room temperature, however, they can be used in the form of a dispersion in the reaction mixtures, since the temperature of the reaction mixtures increases up to almost 200° C. by the exotherm of the metathesis polymerization and most of the cycloalkenes dispersed finely melts during the polymerization and dissolve in the metathesis polymerization medium. Even if a part of such cycloalkenes of groups (IV)–(V) remains in the form of unpolymerized solid dispersed in the polymer, they can act as effective flame-retardants since they are highly non-volatile.

In the metathesis polymerization of the present invention, it is preferred that the halogen-containing cycloalkenes (a) are of a high purity and do not contain impurities inhibiting the metathesis polymerization reaction.

In the present invention, as the component (b), there are used at least one metathesis polymerizable cyclic compounds which include at least 30 mole %, based on total moles of the cyclic compounds, of DCP. DCP is preferably used in 96–40 mole % based on total moles of all monomers, i.e. total moles of the cycloalkenes (a) and the cyclic compounds (b).

It is preferred that DCP used in the invention is of a high purity of 95% or higher, and more preferably of 97% or higher. The impurities should, of course, be those which do not inhibit activity of the metathesis catalyst system, and they should preferably be metathesis polymerizable. It is preferably that the content of polar compounds which inhibit metathesis polymerization, e.g. as alcohols, carboxylic acids and carbonyl compounds, is as low as possible.

In the present invention, at least one of metathesis polymerizable cyclic compounds other than DCP may by used in the amount of up to 70 mole %, preferably up to 50 mole %, more preferably up to 30 mole %, based on total moles of the cyclic compounds of the component (b), together with DCP.

The cyclic compounds other than DCP are preferably those having 1 or 2 of metathesis polymerizable cycloalkene moieties, more preferably those having norbornene moieties in the structure. Examples of the cyclic compounds other than DCP include dihydrodicyclopentadiene, cyclopentadiene- methylcyclopentadiene-codimer, 5-ethylidenenorbornene, 5-vinylnorbornene, 5-phenylnorbornene, ethylene-bis(5-norbornene), norbornene, 5-cyclohexenylnorbornene, 1,4-methano-1,4,4a,5,6,7,8,8a-octahydronaphthalene, 1,4,5,8-dimethano-1,4,4a,5,6,7,8,8a-octahydronaphthalene, 6-ethylidene-1,4,5,8-dimethano-1,4,4a,5,7,8,8-aheptahydronaphthalene, 1,4,5,8-dimethano-1,4,4a,5,8,8-ahexahydronaphthalene, tri-cyclo[8,2,1,0]-trideca-5,11-diene, norbornodiene, oligocyclopentadiene such as tricyclopentadiene, methyldicyclopentadiene and the like.

As said cyclic compounds other than DCP of the cyclic compounds (b), further, there may be used those having at least one hetero atom such as oxygen, nitrogen and the like together with metathesis polymerizable cycloalkene moiety, preferably norbornene moiety.

The hetero atom forms a polar group in the structure of said cyclic compounds, and the polar group often can moderate the metathesis polymerization reaction.

Examples of the polar groups having such moderation effect preferably include ether groups, carboxylic ester groups, cyano group, N-substituted imido groups and the like.

Examples of the cyclic compounds other than DCP having the polar groups include [(5-norbornenyl)-methyl]phenyl ether, bis[(5-norbornenyl)-methyl]ether, 5-methoxycarbonylnorbornene, 5-methoxycarbonyl-5-methylnorbornene, 5-[(2-ethylhexyloxy)-carbonyl]norbornene, ethylene-bis(5-norbornenecarboxylate), 5-cyanonorbornene, 6-cyano-1,4,5,8-dimethano-1,4,4a,5,6,7,8,8a-octahydronaphthalene, N-butylnadic acid imide, 5-(4-pyridyl)norbornene and the like. It is also preferable that these other cyclic compounds have less impurities which inhibit the metathesis polymerization.

Among of the cyclic compounds other than DCP of the cyclic compounds (b), oligocyclopentadiene such as tricyclopentadiene, ethylidene norbornene, vinylnorbornene, methylcyclopentadiene-cyclopentadiene codimer and methoxycarbonylnorbornene are preferable.

Oligocyclopentadiene is often co-prepared with halogen-containing cycloalkenes during Diels-Alder reaction involving cyclopentadiene Methylcyclopentadien-cyclopentadiene codimer is contained in commercially available DCP as a metathesis polymerizable impurities as well as oligocyclopentadiene. Ethylidenenorbornene, vinylnorbornene and methoxycarbonylnorbornene are commercially available, readily metathesis polymerizable monomers.

In the present invention, the halogen-containing cycloalkenes (a) are used in the range of 60-1 mole %, and the metathesis polymerizable cyclic compounds (b) are used in the range of 40-99 mole %, based on the total moles of the cycloalkenes (a) and cyclic compounds (b).

The copolymerization of the halogen-containing cycloalkenes provides the cross-linked copolymer with flame retardancy and raised softening point, generally of over 100° C.

The content of the halogen-containing cycloalkenes (a) can be freely changed among the above range depending on the kind of the cycloalkenes, the required properties and uses of the molded articles, and the like.

The proportion of the halogen-containing cycloalkenes (a) to the cyclic compounds (b) may be decided in consideration of economy. In general, the proportion of DCP:the halogen-containing cycloalkenes (a):the cyclic compounds other than DCP is preferably 96-40 mole %:4-40 mole %:0-30 mole %, more preferably 90-50 mole %:10-35 mole %:0-20 mole %, amounting to 100 mole % in total.

Further, flame retardants such as antimony oxide, encapsulated red phosphorus and the like may be added with the halogen-containing cycloalkenes to emphasize and to assist the flame retardancy of the halogen-containing cycloalkenes. Such flame retardants are generally insoluble solid and are used in the form of the suspension in monomer solutions. When such flame retardants inhibit the activity of the metathesis catalyst system, they are added to solutions immediately before the polymerization and/or molding. Furthermore, other unpolymerizable flame retardants containing halogens such as decabromodiphenyl ether may be added to increase the flame retardancy.

In general, as well known, the metathesis polymerization catalyst system is composed of two components, i.e. a main catalyst component and an activator component. In the practice of bulk polymerization in the presence of the metathesis polymerization catalyst system, the activator component is first added to the monomer mixture, and the principal catalyst component is added to the mixture to initiate polymerization, and finally the mixture is molded before solidified to produce a cross-linked molded articles. Alternatively, the principal catalyst component and the activator component can be added to the monomer mixture in reversed order. Further, the principal catalyst component and the activator component are simultaneously added to the monomer mixture immediately before pouring the mixture into the mold, and molded articles are prepared in the same manner as the above.

The metathesis polymerization reaction, however, is an exothermal reaction and proceeds very rapidly. Under such situation, the polymerization often occurs before the mixture poured into a mold, and it makes the pouring of the mixture into the mold difficult and makes the production of large sized molded articles difficult.

Accordingly, it is desirable to use a method in which the original reactive monomer solutions to be poured into the mold are separated into multi-part reactive solutions, that is, the catalyst and the activator of the metathesis polymerization catalyst system are added to individual monomer liquids to form multi-part reactive solutions, and then the multi-part reactive solutions are mixed rapidly by means of impingement-mixing (the RIM process) or by using a static mixer, and finally the mixture is immediately poured into a mold wherein it is polymerized and molded.

In this method, the multi-part reactive solutions do not need to have the same composition of monomers each other. The composition of the monomers may be changed freely provided that the whole composition of the monomers is kept within the above-mentioned range. For example, when a polar monomer, which moderates the metathesis polymerization, is used with DCP and the halogen-containing cycloalkenes, it is preferable that the content of the polar monomer is higher in the reactive solution containing the activator component than in that containing the catalyst component.

As the catalyst component of the metathesis polymerization catalyst system are used salts such as halides of tungsten, molybdenum, rhenium or tantalium, preferably, tungsten and molybdenum. Particularly preferable are the tungsten compounds. Among tungsten compounds are preferred tungsten halides, tungsten oxyhalides and the like. More particularly, tungsten hexachloride and tungsten oxychloride are preferred. Organo ammonium tungstate may also be used. However, such tungsten compounds undesirably often initiate cationic polymerization immediately when added directly to the mixture of monomers. It is, therefore, preferable that they are previously suspended in an inert solvent such as, for example, benzene, toluene or chlorobenzene and solubilized by the addition of an alcoholic compound or a phenolic compound.

A chelating agent or a Lewis base is preferably added to the solution containing the tungsten compound in order to prevent undesirable polymerization. Those additives may include acetylacetone, acetoacetic acid, alkyl esters, tetrahydrofuran, benzonitrile and the like. About 1–5 moles of a chelating agent or the Lewis base is preferably used per one mole of the tungsten compound. However, when a polar monomer moderating the metathesis polymerization is used with DCP and the halogen-containing cycloalkenes, the chelating agent or the Lewis base may be omitted. Under such situations, the reactive solution containing the monomer and the catalyst component of the metathesis polymerization catalyst system is kept stable sufficiently for practical use.

The activator components of the metathesis polymerization catalyst system include organic metal compounds such as alkylated products of metals of Group I–Group III in the Periodic Table, preferably, tetraalkyl tins, alkylaluminum compounds and alkylaluminum halide compounds including diethylaluminum chloride, ethylaluminum dichloride, trioctylaluminum, dioctylaluminum iodide, tetrabutyltin and the like. The activator component is dissolved in a mixture of monomers to form the other reactive solution.

According to the present invention, in principle, the molded articles are produced by mixing said two reactive solutions as already described above. The polymerization reaction, however, starts so rapidly when the above-mentioned composition is used, and so the undesirable initiation of polymerization often accompanied by partial gelling occurs before completion of filling of the mixed solution into the mold. In order to overcome the problem, it is preferable to use a polymerization moderating agent.

As such moderators are generally used Lewis bases, particularly, ethers, esters, nitriles and the like.

Examples of the moderators include ethylbenzoate, butyl ether, diglyme, diethyleneglycoldibutylether, benzonitrile and the like. Such moderators are generally added to the reactive solution containing the activator component.

In this case, when a polar monomer moderating the metathesis polymerization is used with DCP and the halogen-containing cycloalkenes in the reactive solution containing the activator component, the Lewis base may also be omitted.

When a tungsten compound is used as the catalyst component, the ratio of the tungsten compound to the above-mentioned monomers is about 1000:1–about 15000:1, and preferably about 2000:1 on molar base. When an alkylaluminum compound is used as the activator component, the ratio of the aluminum compound to the above-mentioned monomers is about 100:1–about 2000:1 and preferably around a ratio of about 200:1–about 500:1 on molar base. The amount of the masking agent or the moderator may be adjusted by experiments depending upon the amount of the catalyst system.

A variety of additives may be used practically in the present invention to improve or to maintain characteristics of the molded articles. The additives include fillers, reinforcing agents, pigments, antioxidants, light stabilizers, macromolecular modifiers and the like. These additives must be added to the starting solutions, since they cannot be added after the solutions are polymerized to the solid molded polymer.

They may be added to either one or both of multi-part reactive solutions. The additives must be ones being substantially unreactive with the highly reactive catalyst or activator component in the solution to avoid trouble as well as not to inhibit polymerization.

If a reaction between the additive and the catalyst is unavoidable but does not proceed so rapidly, the additives can be mixed with the monomers to prepare a third solution, and the third solution is mixed with the first and/or second solutions of the multi-part solutions immediately before pouring the mixture into a mold. When the additive is a solid filler, a reactive solution containing the filler suspended in it can be used. Instead, the mold can be filled with the filler prior to pouring the reactive solutions into the mold.

The reinforcing agents and fillers can improve flexural modulus of the polymer. They include glass fibers, mica, carbon black, wollastonite and the like. The fillers whose surfaces are treated with silan coupling agent may preferably be used.

The molded articles of the invention may preferably contain an antioxidant. Preferably, a phenol- or amine-antioxidant is added previously to the polymerizable solution. Examples of the antioxidants include 2,6-t-butyl-p-cresol, N,N'-diphenyl-p-phenylenediamine, tetrakis(methylene(3,5-di-t-butyl-4-hydroxycinnamate)]methane, methylene-4,4'-bis(3,5-di-t-butylphenol) and the like.

The polymer molded articles of the invention may also contain other polymers, which are added to the monomer solution. Among polymers, elastomers are more preferable, since they increase the impact strength of the molded articles and they effective control the viscosity of the solution. Examples of the elastomers include styrene-butadiene rubber, polybutadiene, styrene-butadiene-styrene triblock rubber, styrene-isoprene-styrene triblock rubber, polyisoprene, butyl rubber, ethylene-propylene rubber, ethylene-propylene-diene terpolymers, nitril rubber and the like.

As described above, the polymer molded articles of the invention are preferably prepared by simultaneous molding with polymerizing, i.e. by RIM process or pre-mix process including RTM and RI process. In RIM process, two-part monomer solutions containing the catalyst and the activator respectively are rapidly mixed in the mixing head of a RIM instrument and the mixture is poured into a mold wherein it polymerizes and is molded.

In pre-mix process, two-part monomer solutions containing the catalyst component and the activator component respectively are previously mixed to prepare a pre-mixture and then the pre-mixture is introduced into a mold. In the pre-mix process, fillers such as glass fibers may be placed in the mold prior to pouring the pre-mixture, or may be added in the pre-mixture.

In both of RIM process and pre-mix process, the mixture can be introduced into the mold under relatively low pressure so that an inexpensive mold is usable. The temperature inside the mold increases rapidly by heat of the polymerization reaction so that the polymerization reaction is completed in a short time. The molded article of the invention can be removed easily from the mold without a releasing agent unlike the polyurethan-RIM process.

The surface of the molded articles of the invention has polarity probably by the oxidized layer formed on the surface so that conventional coatings such as epoxy, polyurethane and the like adhere to the surface well.

The present invention provides a variety of molded articles which include large sized molded articles such as parts of various vehicles including automobiles, motorbikers, motorboats, snowmobiles, etc. and housing of electric and electronic instruments and the like and which have improved fire-retardancy and very high heat resistance.

The invention described herein is illustrated by the following examples. Theses examples do not limit the invention.

EXAMPLES 1-7 AND COMPARATIVE EXAMPLE 1

Preparation of mixed-monomer solutions

Commercially available dicyclopentadiene (DCP) was purified by distillation under nitrogen and reduced pressure to produce purified DCP with a freezing point of 33.4° C. The purity was determined by gas chromatography to be not less than 99%. 119 g of 1,1,2-trichloroethylene was reacted with 101 g of dicyclopentadiene in an autoclave at 190° C., and the product was purified by distillation to produce 61 g of 5,5,6-trichloronorbornene (called "TCN" hereinafter).

Commercially available ethylidenenorbornene (called "EN" hereinafter) was used as the third comonomer. 82.5 g of methyl-acrylate was reacted with 54 g of cyclopentadiene in ether, and the product was purified by distillation to produce 91 g of 5-methoxycarbonylnorbornene (called "MCN" hereinafter) which was also used as the third comonomer.

DCP, TCN and occasionally EN or MCN were mixed in the proportions shown in Table 1 below.

Preparation of solutions containing the catalyst 20 g of tungsten hexachloride was added to 70 ml of anhydrous toluene under nitrogen and then a solution consisting of 21 g of nonylphenol and 16 ml of toluene was added to prepare a catalyst solution containing 0.5 M tungsten in terms of the metal content. The solution was purged with nitrogen overnight to remove hydrogen chloride gas formed by the reaction of tungsten hexachloride with nonylphenol. The resulting solution was used as a catalyst solution for polymerization.

With 10 ml of the above catalys solution were mixed 1.0 ml of acetylacetone and 500 ml of DCP, a DCP/TCN mixture, a DCP/TCN/EN mixture or a DCP/TCN/MCN mixture to prepare the first reactive solution (Solution A) containing 0.001 M tungsten in terms of the metal content.

Preparation of solutions containing activator 0.47 g of tri-n-octylalminum, 0.09 g of dioctylalminum iodide, 0.2 g of diglyme and 500 ml of DCP, a DCP/TCN mixture, a DCP/TCN/EN mixture or a DCP/TCN/MCN mixture were mixed to prepare the second reactive solution (Solution B) containing 0.003 M aluminum in terms of the metal content.

Each of 10 ml of Solution A and 10 ml of Solution B was introduced into two syringes respectively after being kept at a given temperature shown in Table 1 below and thoroughly purged with nitrogen. The solutions in each syringe were rapidly introduced into a glass-flask equipped with a stirrer and were mixed rapidly. Then, the stirrer was removed and a thermo-couple was inserted. There was measured the time at which the reaction mixture reached at 100° C. after the introduction from the syringes (called "polymerization time" hereinafter).

There was produced each of cross-linked molded articles, and it was cut into test pieces.

The softening point of each test piece was measured according to the TMA method as well as the degree of swelling in toluene which is an indication of the chemical resistance of the polymer.

The flame retardancy of each test piece was measured according to JISK-6911-5.24.1 method.

Results are shown in Table 1 below.

TABLE 1

|  | Compar. Example | Example No. | | | | | | |
|---|---|---|---|---|---|---|---|---|
|  | 1 | 1 | 2 | 3 | 4 | 5 | 6 | 7 |
| DCP (mole %) | 100 | 90 | 80 | 70 | 60 | 50 | 85 | 85 |
| TRCN (mole %) | 0 | 10 | 20 | 30 | 40 | 50 | 10 | 10 |
| The third co-monomer (mole %) | 0 | 0 | 0 | 0 | 0 | 0 | EN 5 | MCN 5 |
| Initial temp. when mixed (°C.) | 35 | 35 | 35 | 35 | 35 | 35 | 35 | 35 |
| Polymerization time reaching 100° C. (sec.) | 22 | 44 | 43 | 100 | 76 | 59 | 43 | 46 |
| TMA softening | 93 | 142 | 136 | 144 | 150 | 170 | 138 | 137 |

TABLE 1-continued

|  | Compar. Example | Example No. | | | | | | |
|---|---|---|---|---|---|---|---|---|
|  | 1 | 1 | 2 | 3 | 4 | 5 | 6 | 7 |
| point (°C.) |  |  |  |  |  |  |  |  |
| Degree of swelling* | 1.52 | 1.41 | 1.90 | 2.24 | 2.62 | 2.39 | 1.61 | 1.65 |
| Burned length (mm) | 127 burned out | 8 | 7 | 5 | 3 | 3 | 9 | 9 |

*Samples were immersed in toluene for one day. Then, the weight ratio of the swelled samples to the originals was measured.

Table 1 shows that DCP copolymers containing repeating units derived from TCN have higher softening points and show much improved flame retardancy than DCP homopolymer.

Table 1 also shows that TRCN can moderate the metathesis polymerization reaction of DCP.

EXAMPLES 8-16

Vinyl chloride was reacted with cyclopentadiene in the same manner as Examples 1-7 at 175° C. to produce 5-chloronorbornene (called "MCN" hereinafter).

1,2-Dichloroethylene was reacted with cyclopentadiene at 175° C. in the same manner as Examples 1-7 to produce 5,6-dichloronorbornene (called "DCN" hereinafter).

Tetrachloroethylene was reacted with dicyclopentadiene at 190° C. in the same manner as Examples 1-7 to produce 5,5,6,6-tetrachloronor-bornene (called "TECN" hereinafter).

Each of MCN, DCN and TECN was mixed with DCP and occasionally EN in the proportions shown in Table 2 below to prepare mixed-monomer solutions.

Reactive Solutions A and B were prepared according to the same procedures as Examples 1-7 under using the same catalyst solution and the same activator solution as used in Examples 1-7.

Cross-linked molded articles were produced by mixing Solution A and Solution B and then molding the mixture in the same manner as Examples 1-7.

Polymerization time, TMA softening point, degree of swelling and flame retardancy of the molded articles were measured in the same manners as Examples 1-7. The results are shown in Table 2 below.

Table 2 shows that chlorinated norbornene provide the molded articles with the improved flame retardancy and higher softening point without hindrance of the metathesis polymerization.

Further, the results in Table 2 show that MCN is more advantageous in the increases of softening point and flame retardancy than other chlorinated norbornenes in spite of its lower chlorine content than other chlorinated norbornene.

EXAMPLES 17-22

Vinyl bromide was reacted with dicyclopentadiene at 190° C. in the same manner as Examples 1-7 to produce 5-bromonorbornene (called "MBN" hereinafter).

1,2-Dibromoethylene was reacted with dicyclopentadiene at 190° C. in the same manner as Examples 1-7 to produce 5,6-dibromonorbornene (called "DBN" hereinafter).

Tribromoethylene was reacted with dicyclopentadiene at 190° C. in the same manner as Examples 1-7 to produce 5,5,6-tribromonorbornene (called "TBN" hereinafter).

Each of MBN, DBN and TBN was mixed with DCP in the proportions shown in Table 3 below to prepare mixed-monomer solutions.

Reactive Solutions A and B were prepared according to the same procedures as Examples 1-7 under using the same catalyst solution and the same activator solution as used in Examples 1-7.

Cross-linked molded articles were produced by mixing Solution A and Solution B and then molding the mixture in the same manner as Examples 1-7.

Polymerization time, TMA softening point, degree of swelling and flame retardancy of the molded articles were measured in the same manners as Examples 1-7. The results are shown in Table 3 below.

TABLE 2

|  | Compar. Example | Example No. | | | | | | | | |
|---|---|---|---|---|---|---|---|---|---|---|
|  | 1 | 8 | 9 | 10 | 11 | 12 | 13 | 14 | 15 | 16 |
| DCP (mole %) | 100 | 90 | 80 | 90 | 80 | 90 | 80 | 70 | 60 | 85 |
| Kind of chlorinated | 0 | TECN | TECN | DCN | DCN | MCN | MCN | MCN | MCN | MCN |
| norbornene (mole %) |  | 10 | 20 | 10 | 20 | 10 | 20 | 30 | 40 | 10 |
| EN (mole %) | 0 | 0 | 0 | 0 | 0 | 0 | 0 | 0 | 0 | 5 |
| Initial temp. when mixed (°C.) | 35 | 35 | 35 | 35 | 35 | 35 | 35 | 35 | 35 | 35 |
| Polymerization time reaching 100° C. (sec.) | 22 | 40 | 30 | 42 | 38 | 41 | 29 | 30 | 25 | 38 |
| TMA softening point (°C.) | 93 | 115 | 141 | 110 | 120 | 153 | 165 | 155 | not measured | 150 |
| Degree of swelling | 1.52 | — | — | — | — | 1.62 | 1.77 | 2.333 | 2.67 | 1.68 |
| Burned length (mm) | 127 burned out | 8 | 6 | 9 | 8 | 8 | 5 | 5 | 3 | 8 |

TABLE 3

|  | Compar. Example 1 | Example No. | | | | | |
|---|---|---|---|---|---|---|---|
|  |  | 17 | 18 | 19 | 20 | 21 | 22 |
| DCP (mole %) | 100 | 90 | 80 | 70 | 60 | 90 | 90 |
| Kind of brominated norbornene (mole %) | 0 | MBN 10 | MBN 20 | MBN 30 | MBN 40 | DBN 10 | TBN 10 |
| Initial temp. when mixed (°C.) | 35 | 34 | 35 | 34 | 35 | 35 | 35 |
| Polymerization time reaching 100° C. (sec.) | 22 | 23 | 19 | 19 | 19 | 23 | 25 |
| TMA softening point (°C.) | 93 | 110 | 138 | 187 | 220 | 192 | 271** |
| Degree of swelling | 1.52 | 1.55 | 1.56 | 1.59 | 1.88 | 1.52 | 1.30 |
| Burned length (mm) | 127 burned out | 7 | 6 | 3 | 3 | 5 | 4 |

**Measured after the sample was heated under nitrogen.

Table 3 shows that brominated norbornenes provide the molded articles with the improved flame retardancy and higher softening point without retarding the metathesis polymerization.

EXAMPLES 23-31

5-Chloronorbornene was reacted with dicyclopentadiene at 190° C. in the same manner as Examples 1-7 to produce 6-chloro-1,4, 5,8-dimethano-1,4,4a,5,6,7,8,8a-octahydronaphthalene

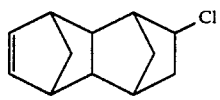

(called "C-DMON" hereinafter).

5,6-dichloronorbornene was reacted with dicyclopentadiene at 190° C. in the same manner as Examples 1-7 to produce 6,7-dichloro-1,4,:5,8-dimethano-1,4,4a,5,6,7,8,8a-octahydronaphthalene

(called "D-DMON" hereinafter).

Each of C-DMON and D-DMON was purified by distillation, and then was mixed with DCP and occasionally ENB in the proportions shown in Table 4 below to prepare mixed-monomer solutions.

Reactive Solutions A and B were prepared according to the same procedures as Examples 1-7 under using the same catalyst solution and the same activator solution as used in Examples 1-7.

Cross-linked molded articles were produced by mixing Solution A and Solution B and then molding the mixture in the same manner as Examples 1-7.

Polymerization time and TMA softening point of the molded articles were measured in the same manners as Examples 1-7. The results are shown in Table 4 below.

TABLE 4

| | Example No. | | | | | | | | |
|---|---|---|---|---|---|---|---|---|---|
| | 23 | 24 | 25 | 26 | 27 | 28 | 29 | 30 | 31 |
| DCP (mole %) | 90 | 70 | 60 | 50 | 90 | 80 | 60 | 50 | 85 |
| Chlorinated DMON | C-DMON | C-DMON | C-DMON | C-DMON | D-DMON | D-DMON | D-DMON | D-DMON | D-DMON |
| (mole %) | 10 | 30 | 40 | 50 | 10 | 20 | 40 | 50 | 10 |
| EN (mole %) | 0 | 0 | 0 | 0 | 0 | 0 | 0 | 0 | 5 |
| Initial temp. when mixed (°C.) | 35 | 35 | 35 | 35 | 35 | 35 | 35 | 35 | 35 |
| Polymerization time reaching 100° C. (sec.) | 27 | 36 | 27 | 27 | 30 | 34 | 45 | 33 | 27 |
| TMA softening point (°C.) | 133 | 165 | 205 | not measured | 120 | 132 | 146 | 174 | 119 |

Table 4 shows that chlorinated DMONs provide the molded articles with the higher softening point without retarding the metathesis polymerization.

It was also observed that all DCP copolymers containing repeating units derived from chlorinated DMON had improved flame retardancy than DCP homopolymer.

EXAMPLES 32-41

Norbornadiene was reacted with hexachlorocyclopentadiene in THF under heat to produce 1,4:5,8-dimethano-1,2,3,4,9,9-hexachloro-1,4,4a,5,8,8a-hexahydronaphthalene (called "HC-DMHN" hereinafter).

Cyclopentadiene was reacted with hexachlorocyclopentadiene in THF under heat to produce 4,7-methano-1,1,2,3,3a,7a-hexachloro-3a,4,7,7a-tetrahydroindene (called "HC-DCP" hereinafter).

Vinylcyclohexane was reacted with hexachlorocyclopentadiene in acetonitrile at 125° C. to produce 1,2,3,4,7,7-hexachloro-5,5'-bisnorbornene (called "HC-BN" hereinafter).

Each of HC-DMHN, HC-DCP AND HC-BN was mixed with DCP in the proportions shown in Table 5 below to prepare mixed-monomer solutions.

Reactive Solutions A and B were prepared according to the same procedures as Examples 1-7 under using the same catalyst solution and the same activator solution as used in Examples 1-7.

Cross-linked molded articles were produced by mixing Solution A and Solution B and then molding the mixture in the same manner as Examples 1-7.

Polymerization time, TMA softening point, degree of swelling and flame retardancy of the molded articles were measured in the same manners as Examples 1-7. The results are shown in Table 5 below.

TABLE 5

| | Example No. | | | | | | | | | |
|---|---|---|---|---|---|---|---|---|---|---|
| | 32 | 33 | 34 | 35 | 36 | 37 | 38 | 39 | 40 | 41 |
| DCP (mole %) | 90 | 80 | 70 | 60 | 90 | 80 | 70 | 60 | 50 | 90 |
| Kind of chlorinated cycloalkene (mole %) | HC-DMHN 10 | HC-DMHN 20 | HC-DMHN 30 | HC-DMHN 40 | HC-DCP 10 | HC-DCP 20 | HC-DCP 30 | HC-DCP 40 | HC-DCP 50 | HC-BN 10 |
| Initial temp. when mixed (°C.) | 35 | 35 | 35 | 35 | 35 | 35 | 35 | 60 | 70 | 35 |
| Polymerization time reaching 100° C. (sec.) | 24 | 24 | 45 | 64 | 32 | 34 | 85 | 21 | 29 | 29 |
| TMA softening point (°C.) | 139 | 161 | 177 | 187 | 140 | 147 | 159 | 187 | 198 | 105 |
| Degree of swelling | 1.79 | 1.79 | 2.60 | 2.78 | 1.82 | 2.31 | 2.51 | 2.90 | 3.54 | — |
| Burned length (mm) | 6 | 5 | 4 | 3 | 7 | 6 | 5 | 5 | 4 | — |

Table 5 shows that chlorinated cycloalkenes provide the molded articles with the improved flame retardancy and higher softening point without retarding the metathesis polymerization.

EXAMPLES 42-43

1,4-Dichlorobutene-2 was reacted with cyclopentadiene at 125° C. in the same manner as Examples 1-7 to produce 5,6-(bischloromethyl)norbornene (called "BCMN" hereinafter).

BCMN was mixed with DCP and occasionally 1,4:5,8-dimethano-1,4,4a,5,6,7,8,8a-hexahydronaphthalene (called "DMON" hereinafter) in the proportions shown in Table 6 below to prepare mixed-monomer solutions.

Reactive Solutions A and B were prepared according to the same procedures as Examples 1-7 under using the same catalyst solution and the same activator solution as used in Examples 1-7.

Cross-linked molded articles were produced by mixing Solution A and Solution B and then molding the mixture in the same manner as Examples 1-7.

Polymerization time, TMA softening point and degree of swelling of the molded articles were measured in the same manners as Examples 1-7. The results are shown in Table 6 below.

Both molded articles showed more improved flame retardancy than articles produced from DCP homopolymer.

TABLE 6

| Example No. | Example 42 | Example 43 |
|---|---|---|
| DCP (mole %) | 90 | 85 |
| BCMN (mole %) | 10 | 10 |
| DMON (mole %) | 0 | 5 |
| Initial temp. when mixed (°C.) | 35 | 35 |
| Polymerization time reaching 100° C. (sec.) | 32 | 30 |
| TMA softening point (°C.) | 99 | 105 |
| Degree of swelling | 1.52 | — |

EXAMPLES 44-46

Norbornenylcarboxylic acid chloride, which was previously produced by the reaction of acrylic acid chloride with cyclopentadiene under Diels-Alder addition reaction, was reacted with sodium pentabromophenolate to prepare pentabromophenonylnorbornenyl-5-carboxylate (called "PBNC" hereinafter), which was then purified by recrystallization (M.P. 129°-130° C.).

PBNC was mixed with DCP and occasionally EN in the proportions shown in Table 7 below to prepare mixed-monomer solutions.

Reactive Solutions A and B were prepared according to the same procedures as Examples 1-7, under using the same catalyst solution and the same activator solution as used in Examples 1-7.

Cross-linked molded articles were produced by mixing Solution A and Solution B and then molding the mixture in the same manner as Examples 1-7.

Polymerization time, TMA softening point, degree of swelling and flame retardancy of the molded articles were measured in the same manners as Examples 1-7. The results are shown in Table 7 below.

TABLE 7

| Example No. | Example 43 | Example 45 | Example 46 |
|---|---|---|---|
| DCP (mole %) | 86 | 93 | 82 |
| PBNC (mole %) | 14 | 7 | 7 |
| EN (mole %) | 0 | 0 | 11 |
| Initial temp. when mixed (°C.) | 35 | 35 | 35 |
| Polymerization time reaching 100° C. (sec.) | 22 | 23 | 22 |
| TMA softening point (°C.) | 131 | 121 | 128 |
| Degree of swelling | 1.74 | 1.68 | 1.70 |
| Burned length (mm) | 2 | 3 | 3 |

Table 7 shows that the copolymerization of PBNC provides the molded articles with the improved flame retardancy and higher softening point without retarding the metathesis polymerization.

EXAMPLES 47-49

5-Aminomethylnorbornene, which was previously produced by the reaction of allylamine with cyclopentadiene under Diels-Alder addition reaction, was reacted with tetrabromophthalic acid anhydride to prepare N-(5-norbornenylmethyl)tetrabromophthalimide (called "NTBP" hereinafter), which was then purified by recrystallization (M.P. 181°-185° C.).

NTBP was mixed with DCP and occasionally EN in the proportions shown in Table 8 below to prepare mixed-monomer solutions.

Reactive Solutions A and B were prepared according to the same procedures as Examples 1-7 under using the same catalyst solution and the same activator solution as used in Examples 1-7.

Cross-linked molded articles were produced by mixing Solution A and Solution B and then molding the mixture in the same manner as Examples 1-7.

Polymerization time, TMA softening point degree of swelling and flame retardancy of the molded articles were measured in the same manners as Examples 1-7. The results are shown in Table 8 below.

TABLE 8

| Example No. | Example 47 | Example 48 | Example 49 |
|---|---|---|---|
| DCP (mole %) | 95 | 97 | 86 |
| NTBP (mole %) | 5 | 3 | 3 |
| NB (mole %) | 0 | 0 | 11 |
| Initial temp. when mixed (°C.) | 35 | 35 | 35 |
| Polymerization time reaching 100° C. (sec.) | 25 | 21 | 20 |
| TMA softening point (°C.) | 120 | 121 | 125 |
| Degree of swelling | 1.32 | 1.39 | 1.43 |
| Burned length (mm) | 3 | 4 | 4 |

Table 8 shows that the copolymerization of NTBP provides the polymers with the improved flame retardancy and higher softening point.

EXAMPLES 50-51

Nadic acid anhydride was reacted with 2,4,6-trichloroaniline in the presence of anhydrous zinc chloride in benzene under heat to produce rude 2,4,6-trichlorophenyl nadic acid imide (called "TCPN" hereinafter), which was then purified by recrystallization from ethanol (M.P. 150°-152° C.).

TCPN was mixed with DCP in the proportion shown in Table 9 below to prepare mixed-monomer solutions.

Reactive Solutions A and B were prepared according to the same procedures as Examples 1-7 under using the same catalyst solution and the same activator solution as used in Examples 1-7.

Cross-linked molded articles were produced by mixing Solution A and Solution B and then molding the mixture in the same manner as Examples 1-7.

Polymerization time, TMA softening point, degree of swelling and flame retardancy of the molded articles were measured in the same manners as Examples 1-7. The results are shown in Table 9 below.

TABLE 9

| Example No. | Example 50 | Example 51 |
|---|---|---|
| DCP (mole %) | 91 | 96 |
| TCPN (mole %) | 9 | 4 |
| Initial temp. when mixed (°C.) | 35 | 35 |
| Polymerization time reaching 100° C. (sec.) | 21 | 23 |
| TMA softening point (°C.) | 121 | 120 |
| Degree of swelling | 1.50 | 1.53 |
| Burned length (mm) | 4 | 3 |

Table 9 shows that the copolymerization of TCPN provides the polymers with the improved flame retardancy and higher softening point.

EXAMPLES 52-55

5-(p-Chlorophenyl)norbornene (called "CPN" hereinafter) was prepared from p-chlorostyrene and dicyclopentadiene in a pressure vessel and purified by fractional distillation.

CPN was mixed with DCP in the proportions shown in Table 10 below to prepare mixed monomer solutions. Reaction Solutions A and B were prepared by using the same catalyst solution and the same activator solution as used in Examples 1-7.

Cross-linked molded articles were produced by mixing Solution A and Solution B and then molding the mixture in the same manner as Examples 1-7.

Polymerization time, TMA softening point and degree of swelling of the molded articles were measured in the same means as those Examples 1-7. The results are shown in Table 10 below.

Table 10 shows that chlorinated norbornene provides the molded articles with the improved higher softening point without retarding the metathesis polymerization.

The resins also show slower burning than the DCP homopolymer when ignited, indicating the improved fire retardancy.

TABLE 10

| Example No. | Example 52 | Example 53 | Example 54 | Example 55 |
|---|---|---|---|---|
| DCPD (mole %) | 93 | 86 | 78 | 70 |
| Kind of chlorinated norbornene (mole %) | CPN 7 | CPN 14 | CPN 22 | CPN 30 |
| Initial temp. when mixed (°C.) | 30 | 30 | 30 | 30 |
| Polymerization time reaching 100° C. (sec.) | 40 | 47 | 43 | 45 |
| TMA softening point (°C.) | 126 | 134 | 134 | 136 |
| Degree of swelling | 1.52 | 1.75 | 2.12 | 1.87 |

EXAMPLES 56-58 AND COMPARATIVE EXAMPLES 2-4

Dicyclopentadiene was heated in an autoclave at 190° C., and tricyclopentadiene was isolated from the reaction mixture by fractional distillation. Commercially available methyl-dicyclopentadiene, methylcyclopentadienecyclopentadiene codimer and vinylnorbornene were purified by distillation and were used as the third comonomer.

Each of tricyclopentadiene, methyldicyclopentadiene and vinylnorbornene was mixed with DCP and hexachlorodicyclopentadiene (called "HC-DCP" hereinafter) in the proportions shown in Table 11 below to prepare mixed-monomer solutions.

Reactive Solutions A and B were prepared according to the same procedures as Examples 1-7 under using the same catalyst solution and the same activator solution as used in Examples 1-7.

Cross-linked molded articles were produced by using Solution A and Solution B and then molding the mixture in the same manner as Examples 1-7.

Polymerization time, TMA softening point, degree of swelling and flame retardancy of the molded articles were measured in the same means as those of Examples 1-7.

The results are shown in Table 11 below.

Table 11 shows that copolymers, which contain tricyclopentadiene, methyldicyclopentadiene or vinylnorbornene, have improved flame retardancy and higher softening point as a result of copolymerization with HC-DCP.

TABLE 11

| Example No. | Compar. Example 2 | Example 56 | Compar. Example 3 | Example 57 | Compar. Example 4 | Example 58 |
|---|---|---|---|---|---|---|
| DCPD (mole %) | 90 | 70 | 90 | 70 | 90 | 80 |
| Kind of chlorinated norbornene (mole %) | — | HC-DCP 20 | — | HC-DCP 20 | — | HC-DCP 10 |
| Comonomers (mole %) | Tricyclopentadiene 10 | Tricyclopentadiene 10 | Vinyl-norbornene 10 | Vinyl-norbornene 10 | Methyl dicyclopentadiene 10 | Methyl dicyclopentadiene 10 |
| Initial temp. when mixed (°C.) | 35 | 35 | 35 | 35 | 35 | 35 |
| Polymerization time reaching 100° C. (sec.) | 34 | 42 | 45 | 55 | 37 | 45 |
| TMA softening point (°C.) | 128 | 158 | 99 | 144 | 104 | 147 |
| Degree of swelling | 1.78 | 2.42 | 1.81 | 2.35 | 1.84 | 2.40 |
| Burned length (mm) | 127 burned out | 5 | 127 burned out | 6 | 127 burned out | 6 |

What we claim is:

1. A metathesis bulk-polymerized cross-linked halogen-containing copolymer comprising:
   (a) 60–1 mole % of repeating units derived from at least one metathesis polymerizable halogen-containing cycloalkene selected from the group consisting of:
   (I) cycloalkenes produced by reacting halogenated ethylene with a diene according to a Diels-Alder addition reaction,
   (II) cycloalkenes produced by reacting hexachlorocyclopentadiene with another unsaturated compound according to a Diels-Alder addition reaction, and
   (III) cycloalkenes having at least one halogenated aromatic substituent group bonded to the cycloaklene moiety through a hetero-atom containing group, and
   (b) 40–99 mole % of repeating units derived from at least one metathesis polymerizable cyclic compound which contains at least 30 mole %, based on the total moles of the metathesis polymerizable cyclic compounds (b), dicyclopentadiene but does not contain any halogen atom in its structure.

2. A copolymer of claim 1 in which the proportion of the repeating units derived from dicyclopentadiene:the repeating units derived from the halogen-containing cycloalkenes:the repeating units derived from the cyclic compound other than dicyclopentadiene is 96–40 mole %:4–40 mole %:0–30 mole %.

3. A copolymer of claim 1 which contains repeating units derived from at least one of oligocyclopentadiene mainly comprising tricyclopentadiene, ethylidenenorbornene, vinylnorbornene, methylcyclopentadienecyclopentadiene codimer and methoxycarbonylnorbornene.

4. A copolymer of claim 1 in which component (a) is derived from 5,5,6-trichloronobornene and component (b) is derived from dicyclopentadiene.

* * * * *

UNITED STATES PATENT AND TRADEMARK OFFICE
CERTIFICATE OF CORRECTION

PATENT NO. : 4,994,535           Page 1 of 3

DATED : February 19, 1991

INVENTOR(S) : Z. Endo, S. Hara & H. Mera (Case 3-6)

It is certified that error appears in the above-identified patent and that said Letters Patent is hereby corrected as shown below:

Col. 5 between lines 25 and 30

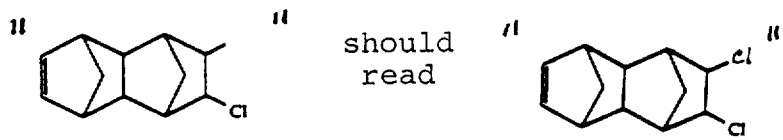

Col. 6 between lines 25 and 30

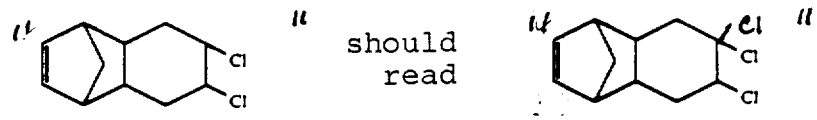

Col. 7 and 8, second set of benzene rings from top of page,

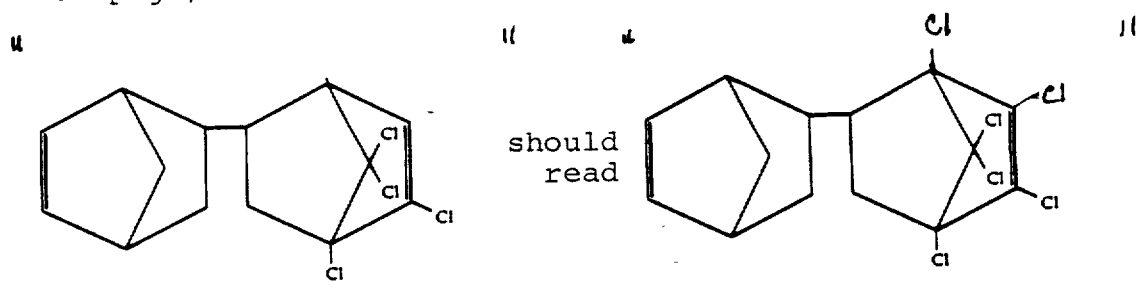

UNITED STATES PATENT AND TRADEMARK OFFICE
CERTIFICATE OF CORRECTION

PATENT NO. : 4,994,535 (Cont'd)  Page 2 of 3
DATED : February 19, 1991
INVENTOR(S) : Z. Endo, S. Hara & H. Mera (Case 3-6)

It is certified that error appears in the above-identified patent and that said Letters Patent is hereby corrected as shown below:

Col. 7, last benzene ring on page,

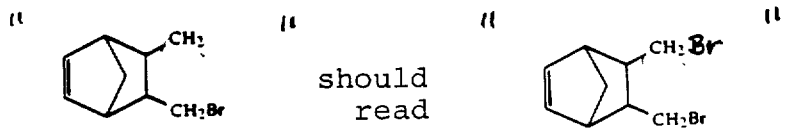

Col. 13, line 23, "-cyclopentadiene-  methylcy-" should read --cyclopentadiene-methylcy- --;

Col. 13, lines 29 and 30, "6-ethylidene-1,4,5,8-dimethano-1,4,4a,5,7,8,8-aheptahydronaphthalene" should read -- 6-ethylidene-1,4,5,8-dimethano-1,4,4a,5,7,8,8a-heptahydronaphthalene" --;

Col. 13, lines 30 and 31, "1,4,5,8-dimethano-1,4,4a,5,8,8-ahexahydronaphthalene" should read -- 1,4,5,8-dimethano-1,4,4a,5,8,8a-hexahydronaphthalene --;

UNITED STATES PATENT AND TRADEMARK OFFICE
CERTIFICATE OF CORRECTION

PATENT NO. : 4,994,535

DATED : February 19, 1991

INVENTOR(S) : Z. Endo, S. Hara & H. Mera

It is certified that error appears in the above-identified patent and that said Letters Patent is hereby corrected as shown below:

Col. 18, line 21, "catalys" should read -- catalyst --;

Col. 21, line 27, "6-chloro-1,4, 5,8-dimethano-1,..." should read -- 6-chloro-1,4:5,8-dimethano-1,... --;

Col. 26, line 18, "Reaction" should be indented to begin a new paragraph; and

In the Claims, Col. 28, lines 4 and 5, "cycloaklene" should read -- cyclo- alkene --.

Signed and Sealed this

Twenty-first Day of July, 1992

Attest:

DOUGLAS B. COMER

Attesting Officer　　　Acting Commissioner of Patents and Trademarks